US010033901B1

United States Patent
Gnanadevalu et al.

(10) Patent No.: US 10,033,901 B1
(45) Date of Patent: Jul. 24, 2018

(54) SYSTEM AND METHOD FOR USING A MOBILE CAMERA AS A COPIER

(71) Applicant: Xerox Corporation, Norwalk, CT (US)

(72) Inventors: Krishnamurthy Venugopal Gnanadevalu, Chennai (IN); Sainarayanan Gopalakrishnan, Chennai (IN); Mohan Vijayalaya Pandian, Tamilnadu (IN); Vignesh Doss, Tamil Nadu (IN)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/634,478

(22) Filed: Jun. 27, 2017

(51) Int. Cl.
*H04N 1/04* (2006.01)
*H04N 1/195* (2006.01)
(Continued)

(52) U.S. Cl.
CPC ....... *H04N 1/19594* (2013.01); *H04N 1/1061* (2013.01); *H04N 1/32128* (2013.01);
(Continued)

(58) Field of Classification Search
CPC ...... G06F 3/011; G06F 3/013; G06F 19/3406; G06F 19/3418; G06F 19/3468; G06F 21/32; G06F 3/005; G06F 3/0304; G06F 3/0346; G06F 1/163; G06F 21/34; G06F 3/012; G06F 3/014; G06F 3/03547; G06F 3/0488; G06F 3/1204; G06F 3/1238; G06F 3/1285; G06F 3/167; G06F 13/00; G06F 19/326; G06F 19/3456; G06F 19/3462; G06F 1/1628; G06F 1/1632; G06F 21/602; G06F 21/6245; G06F 2203/0331; G06F 2203/0338; G06F 3/016; G06F 3/0227; G06F 3/0425; G06F 3/0428; G06F 3/04815; G06F 3/04842; G06F 3/04845; G06F 3/04847; G06F 3/0486; G06F 3/1222;
(Continued)

(56) References Cited

U.S. PATENT DOCUMENTS 6,325,288 B1 * 12/2001 Spitz ................. G06K 7/10673
235/462.01
6,904,183 B2 * 6/2005 Slatter .................... G06K 9/20
358/450

(Continued)

OTHER PUBLICATIONS

Harris, C. et al., A Combined Corner and Edge Detector, Proceedings of the 4th Alvey Vision Conference (1988) pp. 147-151.

(Continued)

*Primary Examiner* — Negussie Worku
(74) *Attorney, Agent, or Firm* — Kermit D. Lopez; Luis M. Ortiz; Ortiz & Lopez, PLLC

(57) ABSTRACT

Methods and systems for copying media. A telescopic and swivel configured pole includes an arm that supports a camera for acquiring an image of media. A flat bed is configured with markers that facilitate imaging and a detection of the DPI of the image of the media located on the flat bed within a boundary of the markers. The pole is adjustable moveable in a telescopic and/or swivel manner for an acquisition and reproduction of the image in a dimensional scale representative of the actual scale of the media.

20 Claims, 5 Drawing Sheets

(51) Int. Cl.
*H04N 1/10* (2006.01)
*H04N 1/32* (2006.01)

(52) U.S. Cl.
CPC ............... *H04N 2201/0081* (2013.01); *H04N 2201/0084* (2013.01); *H04N 2201/0091* (2013.01); *H04N 2201/3225* (2013.01)

(58) Field of Classification Search
CPC ...... G06F 3/1267; G06F 3/1292; G06F 3/165; H04N 1/10; H04N 1/00381; H04N 1/00395; H04N 1/00403; H04N 1/00488; H04N 1/00827; H04N 1/19594; H04N 1/409; H04N 1/4092; H04N 1/4413; H04N 1/442; H04N 1/4433; H04N 1/444; H04N 1/46; H04N 1/58; H04N 1/60; H04N 2201/0081; H04N 2201/0084; H04N 2201/0098; H04N 5/23229; H04N 5/2357; H04N 1/00204; H04N 1/00251; H04N 1/00408; H04N 1/00411; H04N 1/00541; H04N 1/00557; H04N 1/00559; H04N 1/00854; H04N 1/00875; H04N 1/00925; H04N 2201/0094; H04N 2201/0096; H04N 5/2253; H04N 7/183; H04N 9/04; H04N 1/04; H04N 1/191; H04N 1/193; H04N 1/40; H04N 1/00; H04N 1/387
USPC ........ 358/1.15, 447, 479, 513, 474, 1.2, 1.9, 358/3.24, 3.28, 442, 448, 450, 468, 487, 358/497, 523, 532; 348/150, 226.1, 135, 348/169, 222.1; 382/114, 116, 182, 218, 382/190; 399/254; 901/1, 41, 46; 235/462.14, 462.22, 462.24
See application file for complete search history.

(56) References Cited

U.S. PATENT DOCUMENTS

| | | | |
|---|---|---|---|
| 6,965,460 B1* | 11/2005 | Gann | H04N 1/193 358/453 |
| 7,228,365 B2 | 6/2007 | Schlonski et al. | |
| D560,220 S | 1/2008 | Barron | |
| 7,556,202 B2 | 7/2009 | Roquemore, III et al. | |
| 7,692,803 B2 | 4/2010 | Silverbrook et al. | |
| 8,189,081 B2 | 5/2012 | Totsuka | |
| 8,508,751 B1* | 8/2013 | Shen | H04N 1/00204 358/1.1 |
| 8,550,617 B2 | 10/2013 | Rosati et al. | |
| 8,559,063 B1* | 10/2013 | Booppanon | G03B 17/561 358/302 |
| 8,705,086 B2 | 4/2014 | Ohk | |
| 8,995,036 B2 | 3/2015 | Ishida | |
| 9,067,412 B2 | 6/2015 | Yamanaka et al. | |
| 9,137,414 B2 | 9/2015 | Shen | |
| 9,277,081 B2 | 3/2016 | Nagatani et al. | |
| 9,374,495 B2 | 6/2016 | Sewell et al. | |
| 9,467,596 B2 | 10/2016 | Kageta | |
| 9,619,724 B2 | 4/2017 | Watari et al. | |
| 9,626,000 B2 | 4/2017 | Kurzweil et al. | |
| 9,712,697 B1* | 7/2017 | Gopalakrishnan | H04N 1/0044 |
| 9,742,952 B2* | 8/2017 | Gibbons | H04N 1/04 |
| 2005/0219616 A1* | 10/2005 | Furuta | G06K 9/2054 358/1.18 |
| 2006/0067588 A1* | 3/2006 | Makino | G06K 9/3241 382/276 |
| 2006/0091268 A1* | 5/2006 | Lee | H04M 1/0214 248/187.1 |
| 2010/0061787 A1 | 3/2010 | Katayama | |
| 2013/0021654 A1* | 1/2013 | Ogawa | H04N 1/00381 358/474 |
| 2014/0347709 A1* | 11/2014 | Stafford | H04N 1/19594 358/479 |
| 2015/0092253 A1* | 4/2015 | Kasahara | H04N 1/00997 358/475 |
| 2015/0227830 A1* | 8/2015 | Shafran | G06K 19/07745 235/492 |
| 2015/0273896 A1 | 10/2015 | Koizumi et al. | |
| 2016/0214400 A1 | 7/2016 | Kawai | |
| 2016/0219163 A1* | 7/2016 | Shirado | H04N 1/00257 |
| 2016/0271367 A1 | 9/2016 | Hyde et al. | |
| 2016/0286080 A1* | 9/2016 | Hayashi | G06T 7/11 |
| 2016/0288439 A1* | 10/2016 | Louko | B29D 35/122 |
| 2016/0349278 A1 | 12/2016 | Johns et al. | |
| 2017/0080705 A1 | 3/2017 | Shmaiser et al. | |
| 2017/0090035 A1 | 3/2017 | Shingyoji | |
| 2017/0090370 A1 | 3/2017 | Shinagawa | |

OTHER PUBLICATIONS

Rosten, E. et al., Machine learning for high-speed corner detection, European Conference on Computer Vision (2006) Springer, Berlin, Heidelberg, pp. 430-443.

Harris Corner Detector, slides taken from Matching with Invariant Features, Frolova, D. et al., The Weizmann Instituted of Science, Mar. 2004, 40 pages.

* cited by examiner

SYSTEM AND METHOD FOR USING A MOBILE CAMERA AS A COPIER

TECHNICAL FIELD

Embodiments are generally related to the field of image-processing and imaging methods and systems. Embodiments also relate to digital cameras that scan and acquire images. Embodiments additionally relate to techniques for allowing a printer to also function as a copier.

BACKGROUND

The majority of basic printers provide support for printing standard image formats instantly through USB and/or wireless communications support. Using external cameras for scanning capabilities, however, which extend a printer for copier applications is a challenge because the pixel dimension capability of the camera is fixed and the content dimension varies with distance between the camera and document to be scanned. In addition, the image printed will be of a default DPI (Dots Per Inch) or printed to fit the page. In such cases, the printed document will not be rendered in the original size of the actual document or scanned object. This restricts the use of, for example, mobile phones and/or camera for use as a copy scanner along with the printer.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved imaging method and system.

It is another aspect of the disclosed embodiments to provide for a method and system that allows a basic stand-alone printer to also function as a copier.

It is another aspect of the disclosed embodiments to provide for methods and systems that use a mobile camera and a telescopic and swivel configured pole or assembly and a flatbed with a reference pattern for acquiring images of media for printing.

The aforementioned aspects and other objectives and advantages can now be achieved as described herein. Methods and systems for copying media are disclosed. In an example embodiment, a telescopic and swivel configured pole can include an arrangement composed of an arm that supports a camera for acquiring an image of media. A flat bed can be configured with markers that facilitate imaging for a detection of a DPI for the image of the media located on the flat bed within a boundary of the markers. The pole is moveable in a telescopic and/or swivel manner for acquisition and reproduction of the image in a dimensional scale representative of the actual scale of the media. The DPI can be detected with an imaging algorithm. The DPI can also be calculated and stored in an image header associated with the image, wherein the image header is triggerable for printing.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
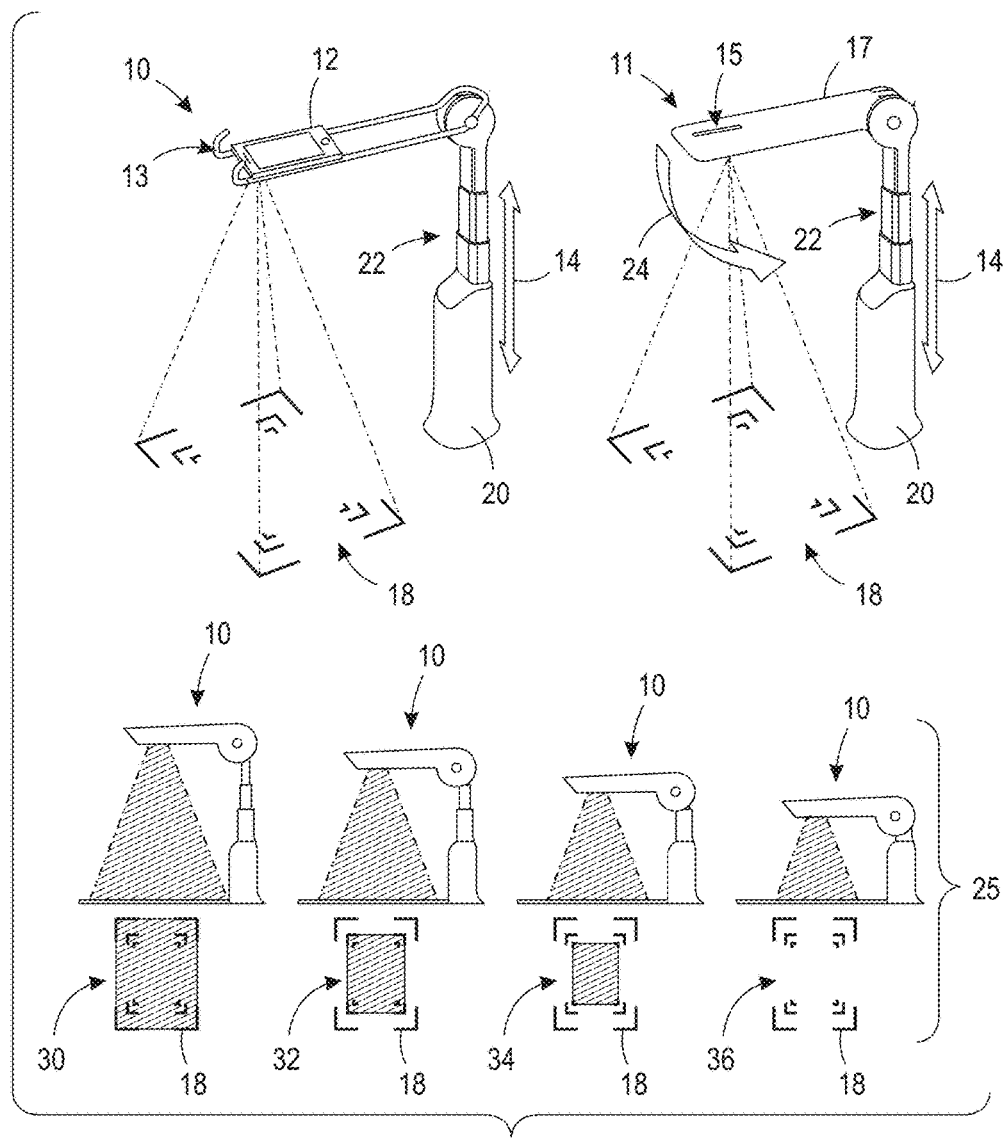
FIG. 1 illustrates a pictorial perspective view of different versions of automatic scanner towers for use in copying and printing an image of a document or media, in accordance with the disclosed example embodiments.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems/devices. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. Additionally, the term "step" can be utilized interchangeably with "instruction" or "operation."

FIG. 1 illustrates a pictorial perspective view of different versions of automatic scanner towers for use in copying and printing an image of a document or media, in accordance with the disclosed example embodiments. Two scanner towers 10 and 11 are shown in FIG. 1. First, an automatic scanner tower 10 is shown, which can be configured for use with a smartphone 12 and includes a smartphone holder 13 for maintaining the smartphone 12, which contains a camera capable of acquiring images of documents/media located above sensor grids 18. The second scanner tower shown in FIG. 1 is an automatic scanner tower 11 that includes a camera 15 that can be configured into an arm 17 of the scanner tower 11.

Each scanner tower 10 and 11 includes a telescopic height adjuster 22 for adjusting the height of the automatic scanner towers 10 and 11 based on the size of the media (e.g., documents, objects, etc.) to be imaged and acquired via the smartphone 12 (i.e., smartphone camera) and/or the camera 15. The bidirectional arrow 14 shown in FIG. 1 indicates the adjustment direction in height (i.e., up or down) of the scanner towers 10 and 11. Each automatic scanner tower 10 and 11 also includes a pole 20 for supporting the scanner towers with respect to the sensor grids 18. The bidirectional arrow 24 shown in FIG. 1 shows the swivel direction of the arm 17 extending from the pole 20.

FIG. 1 thus depicts different example embodiments of an automatic scanner tower for use in scanning and/or copying operations. On the left hand side of FIG. 1, a graphic 25 is also shown, which demonstrates varying levels of adjustable height operations applicable to, for example, the automatic scanner tower 10 and variations 30, 32, 34, 36 in the sensor grids 18. That is, the sensor grids 18 can assist the camera (e.g., smartphone camera or other digital camera) to identify the size of media and adjust the height of the camera for scanning. The top left hand side of FIG. 1 further depicts example sensor grids and how these grids help the camera to identify the size of the media for adjustment of the height of the camera for scanning (e.g., adjustment as indicated by the bidirectional arrow 14).

The disclosed embodiments thus illustrate a method and system for extending a basic stand-alone printer as a copier. The disclosed embodiments depict a simple arrangement of a telescopic and swivel featured pole 20 that supports a camera (e.g., camera 15) or mobile phone (e.g., smartphone 12) to capture an image of a document to be copied. The camera in the smartphone 12, for example, can be used as a 1:1 copy scanner. Normally, without the disclosed device/system or method, it would be a challenge for a normal mobile camera to estimate the actual size of the document/media to be scanned, as the distance between the camera and document is unknown. In the disclosed method and system, a grid like reference pattern can be used with or in the context of a flat bed that includes the sensor grids discussed above.

The flat bed can be configured with a grid pattern of standard size (e.g., Letter, A4, A3, etc.). The document to be captured can be placed in and within the grid and then captured/acquired the camera and/or smartphone (i.e., the camera associated with the smartphone 12). An imaging algorithm detects the grid markings using, for example, a corner detection algorithm. Note that in some of the example embodiments, a Harris corner detection algorithm can be used as a corner detection algorithm.

Once the corner is detected, it is matched with a standard paper size (e.g., Letter, A4, A3, etc.) and the corresponding DPI can then be calculated. Note that as utilized herein, DPI (Dots Per Inch) refers to a measure of spatial printing or video dot density, in particular the number of individual dots that can be placed in a line within the span of 1 inch (2.54 cm). The document can thereafter be lifted using edge detection. Note edge detection is an image processing technique for finding the boundaries of objects within images. Edge detection functions by detecting discontinuities in brightness. Edge detection can be used for image segmentation and data extraction in areas such as image processing, computer vision, and machine vision. At this point, the lifted image is ready to be rendered (e.g., printed). This feature enables a user to use a standalone printer as a copier.

Figure 2:
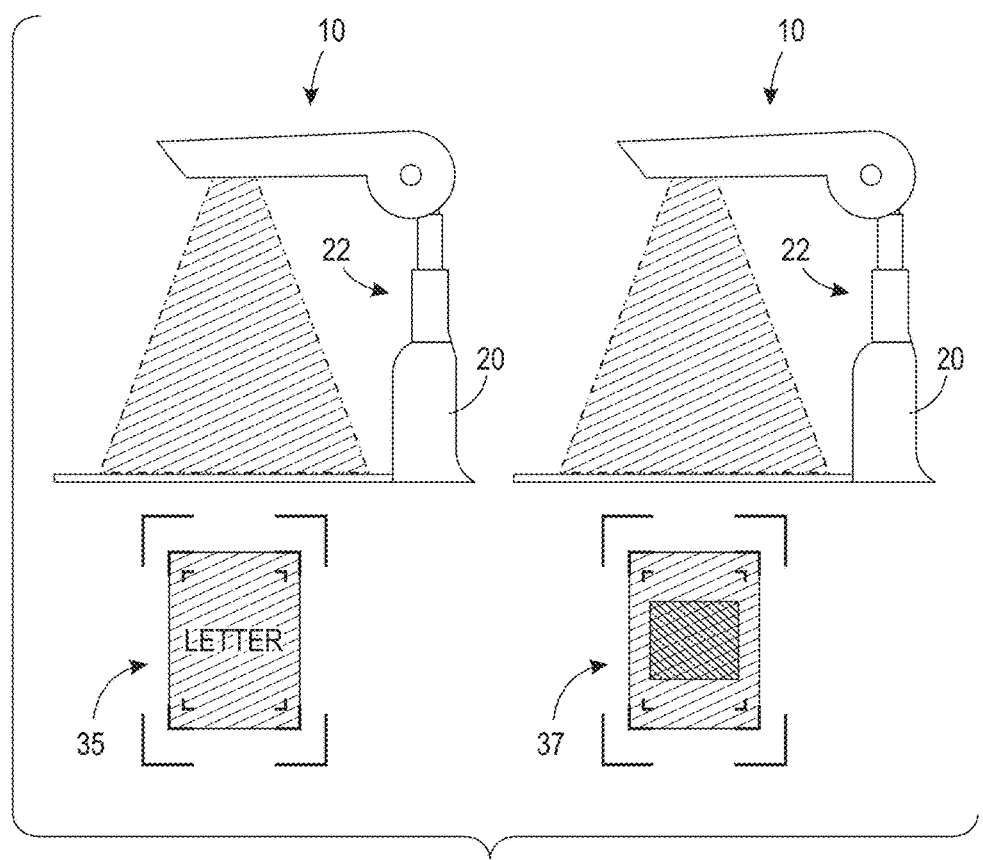
FIG. 2 illustrates a schematic diagram depicting features of a copier system, including a letter size grid with non-standard sized placed document, in accordance with an example embodiment.

FIG. 2 illustrates a schematic diagram depicting features of a copier system, including a letter size grid 35 (shown at the left side of FIG. 2) and a non-standard sized placed document (shown at the right side of FIG. 2), in accordance with an example embodiment. The following steps illustrate a procedure that can be implemented to calculate the size of the captured document. First, the camera (or smartphone) can be placed on a provided slot in the tower and the document/media is placed as shown in FIG. 1. Second, the pole 20 can be adjusted as indicated by the bidirectional arrow in FIG. 1 until the grid markings are visible through the camera and the image is captured. Third, a corner detection algorithm can be implemented to detect the grid marking(s) and identify the type of grid (e.g., A3 or A4 or letter based on the color of the grid marking). Fourth, the pixel dimension within the grid can be derived as X,Y. Fifth, the letter size grid can be employed and its DPI calculated as shown below:

Standard letter size=8.5×11 inches $X_{DPI}$=round($X$/8.5)

$Y_{DPI}$=round($Y$/11)

The above estimated DPI value can be used to print any document placed within a letter size flat bed grid. Thus, as shown in FIG. 2, letter size can be considered to calculate the DPI information, following edge detection, and the corresponding local document/image can be lifted. This case is explained in the context of a real time application in the example depicted in FIG. 3. That is, the disclosed embodiments can implement local document detection operations.

Figure 3:
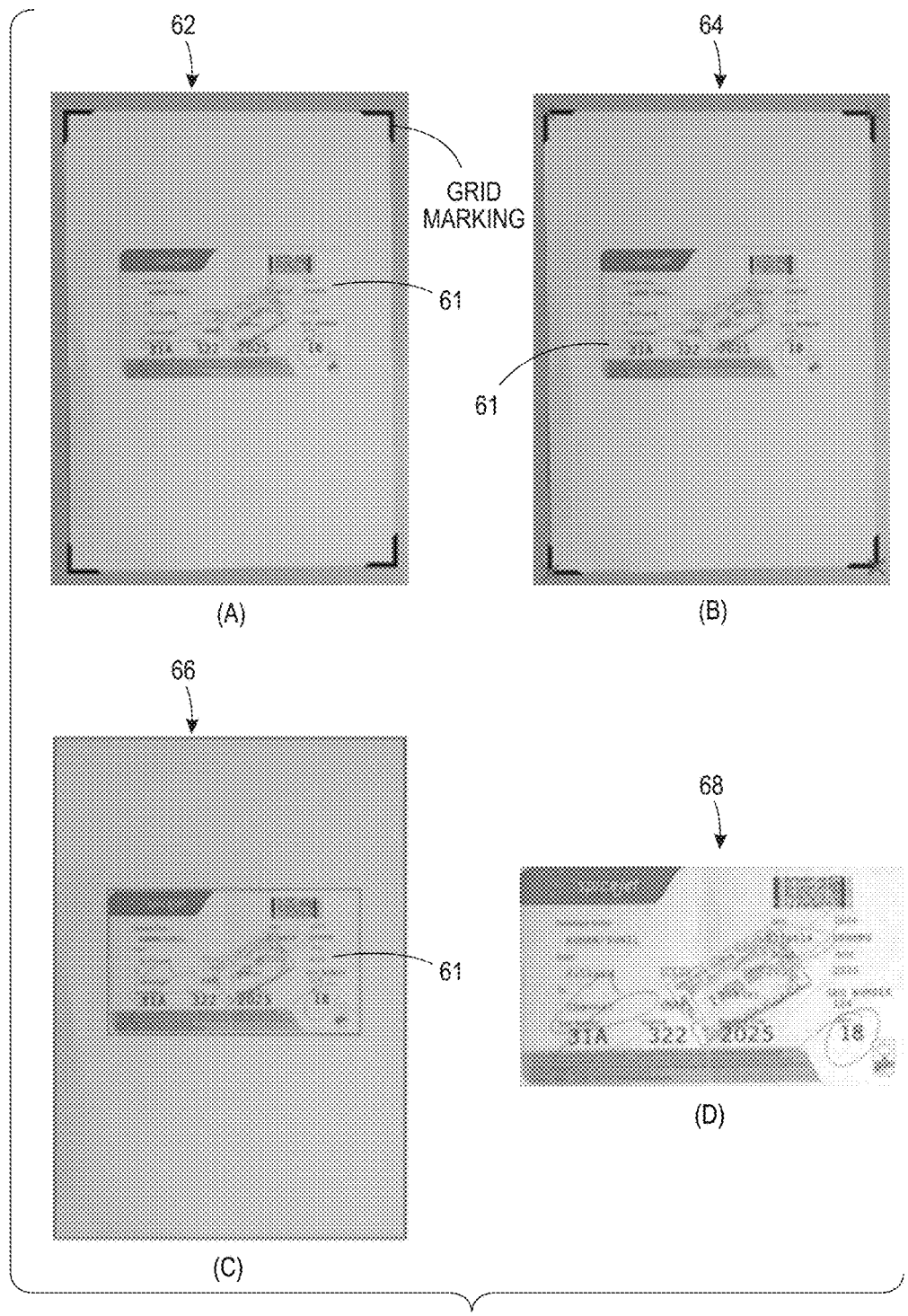
FIG. 3 illustrates a pictorial diagram illustrating operations for capturing an image of a document, in accordance with an example embodiment.

FIG. 3 illustrates a pictorial diagram illustrating operations 62, 64, 66, and 68 for capturing an image of a document 61 using local document detection, in accordance with an example embodiment. Note that in FIG. 3, the four operations 62, 64, 66, and 68 are also respectively indicated by (A), (B), (C) and (D). Thus, FIG. 3 illustrates a location document detection technique or local document detection operations that can include, for example, step (A) wherein an image is captured of a document 61 placed in a letter-sized grid bed; step (B) wherein a corner is detected and a DPI calculation stage implemented, step (C) wherein edge detected of the local document 61 is implemented; and finally step (D) wherein the document 61 is lifted.

Figure 4:
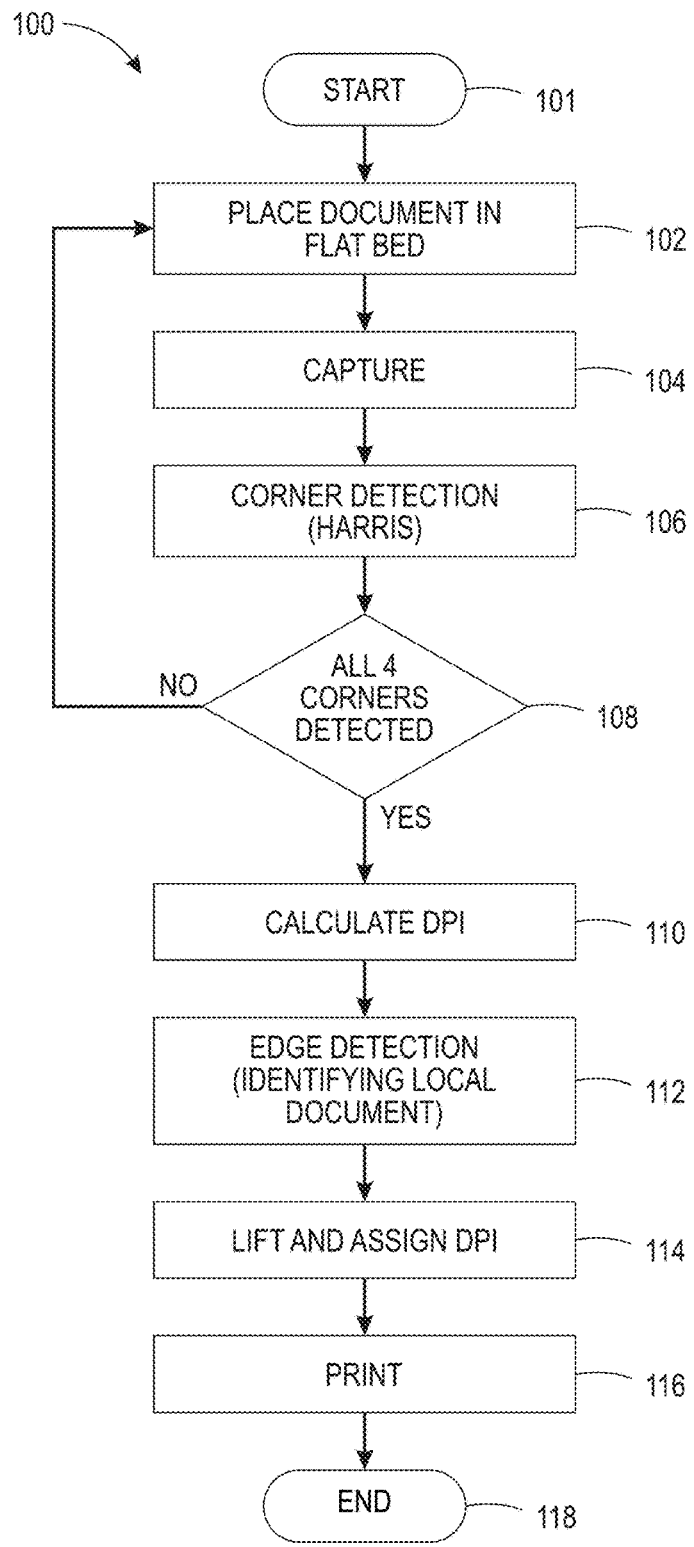
FIG. 4 illustrates a flow chart of operations depicting logical operational steps for implementing a copier system, in accordance with an example embodiment.

FIG. 4 illustrates a flow chart of operations depicting logical operational steps of a method 100 for using a mobile camera as a copier, in accordance with an example embodiment. As indicated at block 101, the process can be initiated. Thereafter, as shown at block 102, a step or operation can be implemented in which the document to be acquired and imaged is placed in a flat bed. Next, as shown at block 104, a step or operation can be implemented for capturing/ acquiring an image of the document. Then, as depicted at block 106, a corner detection operation can be implemented via, for example, a Harris algorithm.

Next, as shown at decision block 108, a test can be implemented to determine if all four corners have been detected (e.g., see step (B) in FIG. 3). If all four corners have not been detected, then the operations shown at block 102, 104, 106, etc., can be repeated. If, however, all four corners have been detected, then as indicated at block 110, an operation can be implemented to calculate the DPI. Thereafter, as illustrated at block 112, an edge detection operation can be implemented for identifying the local document. Thereafter, as shown at block 114, an operation can be processed for lifting and assigning the DPI. Finally, as indicated at block 116, the document can be printed. The process can then terminate, as shown at block 118.

As can be appreciated by one skilled in the art, embodiments can be implemented in the context of a method, data processing system, or computer program product. Accordingly, embodiments may take the form of an entire hardware embodiment, an entire software embodiment, or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object-oriented programming language (e.g., Java, C++, etc.). The computer program code, however, for carrying out operations of particular embodiments may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network e.g., Wi-Fi, Wimax, 802.xx, and cellular network, or the connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks. To be clear, the disclosed embodiments can be implemented in the context of, for example, a special-purpose computer or a general-purpose computer, or other programmable data processing apparatus or system. For example, in some embodiments, a data processing apparatus or system can be implemented as a combination of a special-purpose computer and a general-purpose computer.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein. Such instructions can, for example, include instructions (i.e., steps or operations) such as those depicted in FIG. 4 with respect to blocks 101 to 118.

Note that a processor (also referred to as a "processing device") may perform or otherwise carry out any of the operational steps, processing steps, computational steps, method steps, or other functionality disclosed herein, including analysis, manipulation, conversion or creation of data, or other operations on data. A processor may include a general-purpose processor, a digital signal processor (DSP), an integrated circuit, a server, other programmable logic device, or any combination thereof. A processor may be a conventional processor, microprocessor, controller, microcontroller, or state machine. A processor can also refer to a chip or part of a chip (e.g., semiconductor chip). The term "processor" may refer to one, two, or more processors of the same or different types. It is noted that a computer, computing device and user device, and the like, may refer to devices that include a processor, or may be equivalent to the processor itself.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
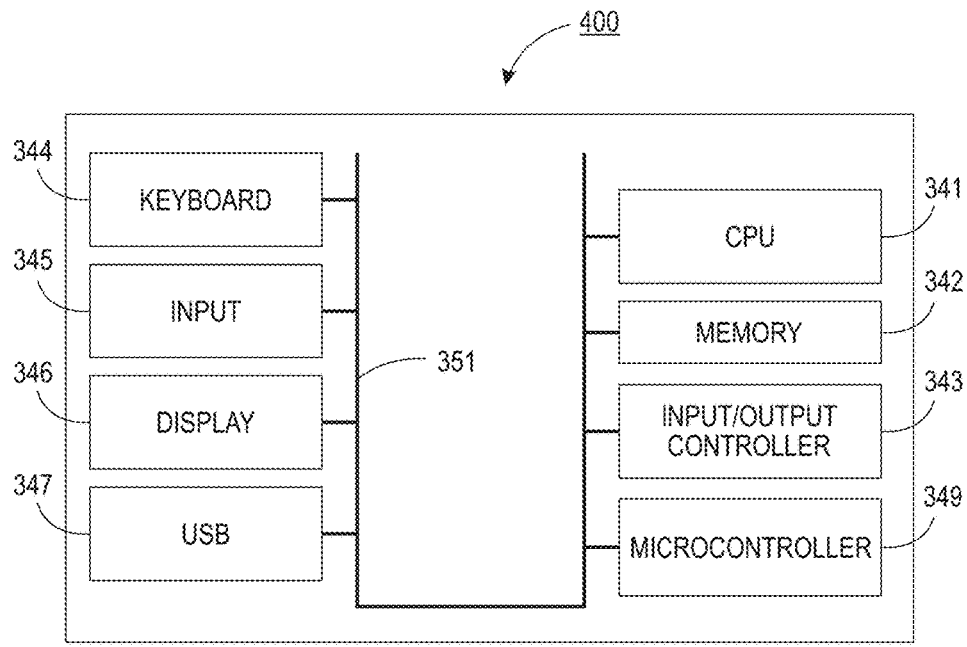
FIG. 5 illustrates a schematic view of a computer system/apparatus, in accordance with an embodiment.
Figure 6:
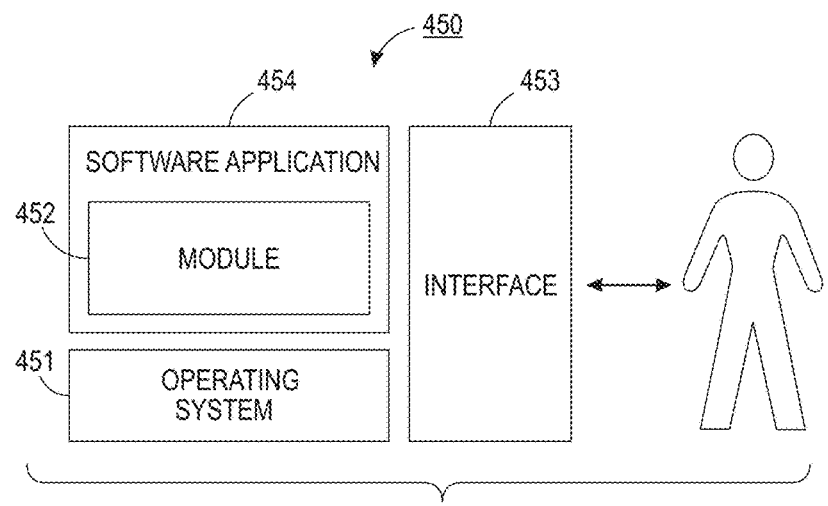
FIG. 6 illustrates a schematic view of a software system including a module, an operating system, and a user interface, in accordance with an embodiment.

FIGS. 5-6 are shown only as exemplary diagrams of data-processing environments in which example embodiments may be implemented. It should be appreciated that FIGS. 5-6 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 5, some embodiments may be implemented in the context of a data-processing system/apparatus 400 that can include, for example, one or more processors such as a processor 341 (e.g., a CPU (Central Processing Unit) and/or other microprocessors), a memory 342, an input/output controller 343, a microcontroller 349 (which may be optional), a peripheral USB (Universal Serial Bus) connection 347, a keyboard 344 and/or another input device 345 (e.g., a pointing device, such as a mouse, track ball, pen device, etc.), a display 346 (e.g., a monitor, touch screen display, etc.), and/or other peripheral connections and components.

As Illustrated, the various components of data-processing system/apparatus 400 can communicate electronically through a system bus 351 or similar architecture. The system bus 351 may be, for example, a subsystem that transfers data between, for example, computer components within data-processing system/apparatus 400 or to and from other data-processing devices, components, computers, etc. The data-processing system/apparatus 400 may be implemented in some embodiments as, for example, a server in a client-server based network (e.g., the Internet) or in the context of a client and a server (i.e., where aspects are practiced on the client and the server).

In some example embodiments, data-processing system/apparatus 400 may be, for example, a standalone desktop computer, a laptop computer, a Smartphone, a pad computing device, and so on, wherein each such device is operably connected to and/or in communication with a client-server based network or other types of networks (e.g., cellular networks, Wi-Fi, etc).

FIG. 6 illustrates a computer software system/apparatus 450 for directing the operation of the data-processing system/apparatus 400 depicted in FIG. 5. Software application 454, stored for example in memory 342, generally includes a module 452. The computer software system/apparatus further includes a kernel or operating system 451 and a shell or interface 453. One or more application programs, such as software application 454, may be "loaded" (i.e., transferred from, for example, mass storage or another memory location into the memory 342) for execution by the data-processing system/apparatus 400. The data-processing system/apparatus 400 can receive user commands and data through the interface 453; these inputs may then be acted upon by the data-processing system/apparatus 400 in accordance with instructions from operating system 451 and/or software application 454. The interface 453 in some embodiments can serve to display results, whereupon a user may supply additional inputs or terminate a session. The software application 454 can include module(s) 452, which can, for example, Implement the various instructions or operations such as those discussed herein with respect to FIGS. 1-4 herein. Module 452 may also be composed of a group of modules or sub-modules that implement particular modules, such as, for example, the various modules (and components/features, etc.) discussed and illustrated herein with respect to FIGS. 1-4.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" can constitute a software application, but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc. In other embodiments, a module may refer to a hardware component or a combination of hardware and software.

FIGS. 5-6 are thus intended as examples and not as architectural limitations of the disclosed embodiments. Additionally, such example embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, such as but not limited to Macintosh, UNIX, LINUX, and so on.

Based on the foregoing, it can be appreciated that a number of example embodiments are disclosed herein. For example, in one embodiment a system for copying media can be implemented. Such a system can include, for example, a telescopic and swivel configured pole having an arm that supports a camera for acquiring an image of media; and a flat bed configured with markers that facilitate imaging and a detection of a DPI of the image of the media located on the flat bed within a boundary of the markers, wherein the pole is moveable in a telescopic and/or swivel manner for an acquisition and a reproduction of the image in a dimensional scale representative of the actual scale of the media.

In some example embodiments, the DPI can be detected with an imaging algorithm. In other example embodiments, the aforementioned imaging algorithm can be a corner detection algorithm. In another example embodiment, the DPI can be calculated and stored in an image header associated with the image, wherein the image header is triggerable for printing.

In another example embodiment, the aforementioned camera may be a digital camera of a mobile computing device, and the mobile computing device can be supported on the arm. In another example embodiment, the mobile computing devices can be, for example, a smartphone or a tablet computing device or another type of mobile computing device. In another example embodiment, the flat bed can include a plurality of grids that assist the camera in identifying a size of the media and adjusting a height of the camera for scanning the media.

In another example embodiment, the telescopic and swivel configured pole can include a telescopic height adjuster. In yet another example embodiment, the aforementioned detection can be a local document detection operation(s) (i.e., also referred to simply as a "local document detection") with respect to the media.

In another example embodiment, a method for copying media can be implemented. Such a method can includes steps or operations such as, for example, providing a telescopic and swivel configured pole having an arm that supports a camera for acquiring an image of media; and imaging and detecting a DPI of the image of the media with a flat bed configured with markers that facilitate the imaging and a detection of the DPI of the image of the media located on the flat bed within a boundary of the markers, wherein the pole is moveable in a telescopic and/or swivel manner for an acquisition and a reproduction of the image in a dimensional scale representative of the actual scale of the media. In another example embodiment, a step or operation can be implemented for calculating and storing the DPI in an image header associated with the image, wherein the image header is triggerable for printing.

In still another example embodiment, a system for copying media can be implemented which can include: a telescopic and swivel configured pole having an arm that supports a camera for acquiring an image of media; a flat bed configured with markers that facilitate imaging and a detection of a DPI of the image of the media located on the flat bed within a boundary of the markers, wherein the pole is moveable in a telescopic and/or swivel manner for an acquisition and a reproduction of the image in a dimensional scale representative of the actual scale of the media; and an imaging algorithm for use in detecting the DPI. The DPI can be calculated and stored in an image header associated with the image, and the image header is triggerable for printing. As indicated previously, the aforementioned imaging algorithm may be a corner detection algorithm.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A system for copying media, said system comprising:
   a telescopic and swivel configured pole having an arm configured to support a smartphone for acquiring an image of media with a camera associated with said smartphone, wherein said media is located below said smartphone and facing said camera of said smartphone; and
   a flat bed configured with markers that facilitate imaging and a detection of a DPI of said image of said media located on said flat bed within a boundary of said markers, wherein said pole is moveable in a telescopic and/or swivel manner for an acquisition and a reproduction of said image by said camera.

2. The system of claim 1 wherein said DPI is detected with an imaging algorithm.

3. The system of claim 2 wherein said imaging algorithm comprises a corner detection algorithm.

4. The system of claim 3 further comprising sensor grids that assist said camera of said smartphone to identify a size of said media and adjust a height of said camera above said media for scanning of said media by said camera associated with said smartphone.

5. The system of claim 4 wherein said flat bed is configured with a plurality of grid markings that assist said camera in identifying said size of said media and adjusting said height of said camera for scanning said media and wherein said corner detection algorithm detects said grid markings for said camera.

6. The system of claim 2 wherein said detection comprises a local document detection with respect to said media, said local document detection including: (A) capturing an image of said image placed in a grid bed configured from said flat bed; (B) detecting at least one corner and performing DIP calculation; (C) implementing edge detection of said media; and thereafter lifting said document.

7. The system of claim 1 wherein said telescopic and swivel configured pole comprises a telescopic height adjuster.

8. The system of claim 2 wherein said DPI is calculated and stored in an image header associated with said image, wherein said image header is triggerable for printing.

9. The system of claim 1 wherein said camera comprises a digital camera and wherein said smartphone is supported on said arm by a smartphone holder for maintaining said smartphone and wherein said swivel manner of said telescopic and swivel configured pole comprises a bidirectional direction.

10. A method for copying media, said method comprising:
    providing a telescopic and swivel configured pole having an arm configured to support a smartphone for acquiring an image of media with a camera associated with said smartphone, wherein said media is located below said smartphone and facing said camera of said smartphone; and
    imaging and detecting a DPI of said image of said media with a flat bed configured with markers that facilitate said imaging and a detection of said DPI of said image of said media located on said flat bed within a boundary of said markers, wherein said pole is moveable in a telescopic and/or swivel manner for an acquisition and a reproduction of said image by said camera.

11. The method of claim 10 further wherein said DPI is detected with an imaging algorithm.

12. The method of claim 11 wherein said imaging algorithm comprises a corner detection algorithm.

13. The method of claim 11 further comprising calculating and storing said DPI in an image header associated with said image, wherein said image header is triggerable for printing.

14. The method of claim 12 wherein said detection comprises a local document detection with respect to said media, said local document detection including: (A) capturing an image of said image placed in a grid bed configured from said flat bed; (B) detecting at least one corner and performing DIP calculation; (C) implementing edge detection of said media; and thereafter lifting said document.

15. The method of claim 12 further comprising:
    providing sensor grids that assist said camera of said smartphone in identifying a size of said media and adjusting a height of said camera above said media for scanning of said media by said camera associated with said smartphone.

16. The method of claim 15 wherein said flat bed is configured with a plurality of grid markings that assist said camera in identifying said size of said media and adjusting said height of said camera for scanning said media and wherein said corner detection algorithm detects said grid markings for said camera.

17. The method of claim 10 wherein said camera comprises a digital camera and wherein said smartphone is supported on said arm by a smartphone holder for maintaining said smartphone and wherein said swivel manner of said telescopic and swivel configured pole comprises a bidirectional direction.

18. The method of claim 10 wherein said telescopic and swivel configured pole comprises a telescopic height adjuster.

19. A system for copying media, said system comprising:
 a telescopic and swivel configured pole having an arm configured with a smartphone holder that supports and maintains a smartphone for acquiring an image of media with a camera associated with said smartphone, wherein said media is located below said smartphone and facing said camera of said smartphone, wherein said telescopic and swivel configured pole includes a telescopic height adjuster and wherein said smartphone holder comprises a curved bracket for holding said smartphone securely on said arm;
 a flat bed configured with markers that facilitate imaging and a detection of a DPI of said image of said media located on said flat bed within a boundary of said markers, wherein said pole is moveable in a telescopic and/or swivel manner for an acquisition and a reproduction of said image by said camera; and
 an imaging algorithm for use in detecting said DPI and wherein said DPI is calculated and stored in an image header associated with said image, wherein said image header is triggerable for printing.

20. The system of claim 19 wherein said flat bed is configured with sensor grids and a plurality of grid markings that assist said camera of said smartphone to identify a size of said media and adjust a height of said camera above said media for scanning of said media by said camera associated with smartphone, and wherein said swivel manner of said telescopic and swivel configured pole comprises a bidirectional direction, and wherein said imaging algorithm comprises a corner detection algorithm.

* * * * *